(12) United States Patent
Kunz et al.

(10) Patent No.: US 7,920,536 B1
(45) Date of Patent: Apr. 5, 2011

(54) MORE ROBUST DATA TRANSFER THROUGH DETECTION OF HIDDEN NODES

(75) Inventors: Manfred Kunz, Rastatt (DE); Joachim Schmalz, Bischweier (DE)

(73) Assignee: Marvell International Ltd., Hamilton (BM)

( * ) Notice: Subject to any disclaimer, the term of this patent is extended or adjusted under 35 U.S.C. 154(b) by 838 days.

(21) Appl. No.: 11/975,215

(22) Filed: Oct. 18, 2007

Related U.S. Application Data

(60) Provisional application No. 60/862,374, filed on Oct. 20, 2006.

(51) Int. Cl.
*H04W 4/00* (2009.01)
(52) U.S. Cl. ........................................................ 370/338
(58) Field of Classification Search .................. None
See application file for complete search history.

(56) References Cited

U.S. PATENT DOCUMENTS

| | | | | |
|---|---|---|---|---|
| 7,184,407 | B1 | 2/2007 | Myles et al. | 370/242 |
| 7,330,696 | B2 * | 2/2008 | Orlassino et al. | 455/41.2 |
| 7,440,432 | B2 * | 10/2008 | Niiho et al. | 370/338 |
| 2002/0071448 | A1 * | 6/2002 | Cervello et al. | 370/445 |
| 2004/0047319 | A1 * | 3/2004 | Elg | 370/338 |
| 2005/0243782 | A1 * | 11/2005 | Sakoda et al. | 370/338 |
| 2007/0217352 | A1 * | 9/2007 | Kwon | 370/312 |

OTHER PUBLICATIONS

"Hidden node problem—Wikipedia", <http://en.wikipedia.org/w/index.php?title=Hidden_node_problem>, visited Apr. 10, 2007.
"Carrier sense multiple access with collision avoidance—Wikipedia", <http://en.wikipedia.org/w/index.php?title=Carrier_sense_multiple_access_with_collision_avoidance>, visited Apr. 10, 2007.
"IEEE 802.11 RTS/CTS—Wikipedia", <http://en.wikipedia.org/w/index.php?title=IEEE_802.11_RTS/CTS>, visited Apr. 10, 2007.
J. Geier, "Improving Wlan Performance with RTS/CTS", Wi-Fi Planet, Aug. 13, 2002, reproduced at <http://www.wi-fiplanet.com/tutorials/print.php/1445641>, visited Apr. 10, 2007.
"Comparative analysis of different media access methods in metropolitan area networking", <http://aqua.comptek.ru/test/HiddenNode/hidden_node_en.htm>, visited Apr. 10, 2007.

* cited by examiner

*Primary Examiner* — Anh-Vu Ly

(57) ABSTRACT

In a wireless network having one or more base stations and one or more access points, the base station is switched automatically from a CSMA/CA exchange protocol to an RTS/CTS exchange protocol, in a case where the base station infers the presence of a hidden node. The presence of a hidden node is inferred by scanning frames of wireless network transmissions to and from other base stations and the access point. In a case where there is a discrepancy in the accrued frames, such that frames have been accrued from the access point to a second base station without also accruing frames from the second base station back to the access point, the presence of a hidden node is inferred, and the base station is switched automatically to RTS/CTS exchange mode.

24 Claims, 9 Drawing Sheets

26

| DEVICE ADDRESS DATABASE | | |
|---|---|---|
| MAC ADDRESS<br><br>27 | FRAMES DETECTED FROM AP TO DEVICE<br>28 | FRAMES DETECTED FROM DEVICE TO AP<br>29 |
| 01:23:45:67:89:AB<br>01:23:45:67:89:BC<br>⋮ | YES<br>YES | YES<br>NO |

26

| DEVICE ADDRESS DATABASE | | |
|---|---|---|
| MAC ADDRESS<br><br>27 | FRAMES DETECTED FROM AP TO DEVICE<br><br>28 | FRAMES DETECTED FROM DEVICE TO AP<br><br>29 |
| 01:23:45:67:89:AB<br>01:23:45:67:89:BC<br>⋮ | YES<br>YES | YES<br>NO |

FIG. 4

MORE ROBUST DATA TRANSFER THROUGH DETECTION OF HIDDEN NODES

CROSS-REFERENCE TO RELATED APPLICATION

This application claims the benefit of U.S. Provisional Patent Application No. 60/862,374, filed Oct. 20, 2006, the contents of which are hereby incorporated by reference as if fully stated herein.

FIELD

The present disclosure relates wireless networking, and more particularly to the automatic detection of hidden nodes (more precisely, hidden base stations) on the wireless network so as to trigger a switch to RTS/CTS (request to send/clear to send) exchange mode.

BACKGROUND

In wireless networking, the phrase "hidden node" refers to a base station that can exchange data wirelessly with some of the base stations in the wireless network but not all of them. Consider, for example, the simplified wireless network shown in FIG. 1, in which there are three base stations: an access point AP and two other stations STA1 and STA2. Each of STA1 and STA2 can exchange data bi-directionally and wirelessly with access point AP. However, because of limitations of transmission range and radio signal visibility, STA1 and STA2 cannot see each other, or exchange data with each other. Thus, STA1 is a "hidden node" from the perspective of STA2, and STA2 is a "hidden node" from the perspective of STA1.

Note that in this simplified diagram, hidden nodes are caused by limitations in transmission range and/or radio signal visibility. However, hidden nodes can be caused by other factors such as physical structures (walls, conductive materials, etc.) or electrical interference that tend to block radio signal transmissions.

The existence of hidden nodes, and the difficulties caused thereby, are both known in the art. Specifically, wireless networks adhering to IEEE 802.11 specifications communicate according to a CSMA/CA protocol: "carrier sense multiple access with collision avoidance". According to the CSMA/CA protocol, a station wishing to transmit first listens on the channel for a predetermined amount of time, to determine whether there is any activity on the channel. If the station senses that the channel is "idle", then the station proceeds to transmit. If the station senses that the channel is "busy", the station defers its transmission for a random interval, before again attempting a transmission.

The CSMA/CA protocol fails to avoid collisions in the presence of hidden nodes, however, since a base station cannot see all other base stations, and thus is unable to make an accurate determination of whether the channel is "idle" or "busy". Again referring to FIG. 1, it is possible that STA2 is currently transmitting to access point AP. STA1 also wishes to transmit. In accordance with CSMA/CA, STA1 listens for a predetermined amount of time on the channel so as to check for activity. However, since STA2 is hidden from the perspective of STA1, STA1 is unable to hear the ongoing transmission from STA2 to access point AP, and therefore makes an inaccurate determination that the channel is "idle". STA1 therefore makes its transmission, which directly collides with the ongoing transmission from STA2, possibly resulting in a failure of both transmissions.

In recognition of this problem, the CSMA/CA protocol has been supplemented with a so-called RTS/CTS exchange mode ("request to send/clear to send"). In the RTS/CTS exchange mode, a station first asks permission to initiate a data transmission, by sending an RTS frame. The RTS frame is addressed to the destination node, which in this example is the access point AP. The destination node replies with a CTS frame, to signify that it is safe to transmit. Any other node receiving the CTS frame refrains from sending data for a given period of time. Thus, in this example, since access point AP is visible to all base stations including STA1 and STA2, STA2 would refrain from transmitting data for a given period of time upon receipt of a CTS frame directed to STA1. Therefore, because of the RTS/CTS handshake, collisions caused by hidden nodes can be avoided.

One difficulty with the RTS/CTS exchange mode is that it introduces delays and transmission overhead that are not needed unless a hidden node is present. Specifically, since a successful RTS/CTS handshake is required before actual data transmission is initiated, there is a delay before actual data transmission, resulting in significant reductions in available network bandwidth. Moreover, the RTS/CTS handshake itself requires consumption of some of the available bandwidth, simply to establish the handshake. For these reasons, the RTS/CTS exchange mode is normally off by default, and must be turned on manually if a network administrator determines that it is needed because of the presence of a hidden node.

SUMMARY

Embodiments of the present invention address the foregoing situation through automatic detection of the presence of a hidden node, followed by an automatic switch to RTS/CTS exchange mode in the event that a hidden node is detected.

Detection of a hidden node is made through inference. Specifically, each base station scans frames coming from an access point to other base stations with the same BSSID ("basic service set identifier"), as well as traffic from other base stations with the same BSSID back to the access point. If a first base station sees frames from the access point to a second base station, but does not see corresponding traffic back from the second base station to the access point, the first base station can infer that the second base station is a hidden node. Having detected that there is a hidden node, the first base station can switch to RTS/CTS exchange mode with the access point.

Likewise, the second base station sees frames from the access point to the first base station, but since the first base station is hidden, the second base station does not see corresponding traffic back from the first base station to the access point. Accordingly, the second base station can infer that the first base station is a hidden node, and can switch automatically to RTS/CTS exchange mode.

By virtue of the foregoing, the base stations can remain in a more efficient CSMA/CA protocol, without the added burden of RTS/CTS exchange mode. However, when a hidden node is detected, through frame monitoring as described above, each base station can switch automatically to RTS/CTS exchange mode, independently of actions taken by other base stations, and ordinarily without the need for manual intervention.

According to one embodiment of the invention, a base station is provided for communication in a wireless network environment. The base station includes a radio channel for sending and receiving frames of wireless network transmissions according to a CSMA/CA protocol, and a controller for accruing frames from an access point to other base stations, as well as for accruing frames from other base stations back to the access point. The controller switches the radio channel to an RTS/CTS exchange mode in a case where there is a discrepancy in the accrued frames, such that frames are accrued from the access point to a second base station without also accruing frames from the second base station back to the access point. The wireless network transmissions may be conducted according to IEEE 802.11 protocol, and the radio channel sends and receives frames of wireless network transmissions with the same BSSID or across different BSSID's.

According to another embodiment of the invention, in a wireless network which includes at least one base station and at least one access point, frames of wireless network transmissions are accrued from the access point to other base stations and from other base stations to the access point. In a case where there is a discrepancy in the accrued frames, such that frames are accrued from the access point to a second base station without also accruing frames from the second base station back to the access point, a communication mode of the base station is switched from CSMA/CA to RTS/CTS exchange mode. Frames may be accumulated from the same BSSID, or across different BSSID's.

In further embodiments, the invention may be implemented in means for performing the functions described herein, or on a computer readable memory medium which stores computer-executable program code executable by a computer such as the MPU in a base station so as to perform the functions described herein.

This brief summary has been provided so that the nature of this disclosure may be understood quickly. A more complete understanding can be obtained by reference to the following detailed description and the attached drawings.

BRIEF DESCRIPTION OF THE DRAWINGS

FIG. 4 shows the structure of the database.

DETAILED DESCRIPTION

Figure 1:
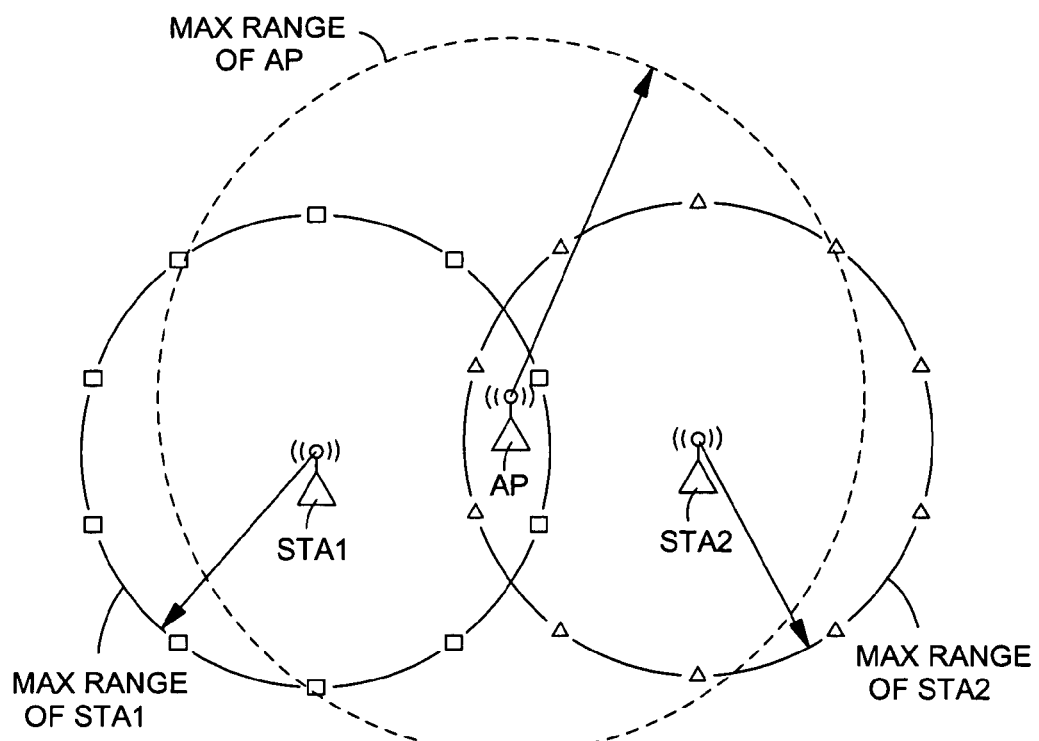
FIG. 1 is a view for explaining hidden nodes.
Figure 2:
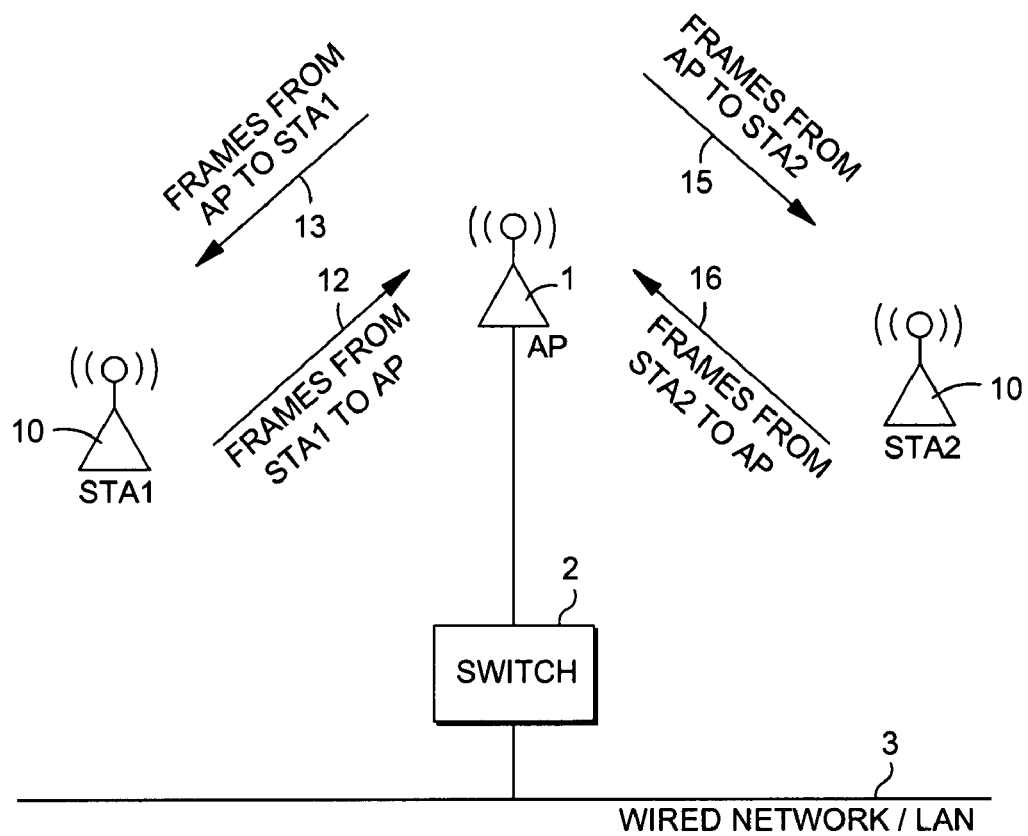
FIG. 2 is a simplified view of a representative wireless local area network.

FIG. 2 is a simplified view of a representative wireless local area network (WAN) which includes one or more access points AP, such as access point 1, that provides access to a wired network or LAN 3 through a switch 2. FIG. 2 shows a single access point; if more access points are provided, then they are arranged for overlapped geographic coverage of the WAN, and each access point typically uses a communication channel (BSSID) that is independent and distinct from the communication channels of other access points in the WAN.

FIG. 2 further shows multiple base stations 10 operating within the geographic coverage of the WAN. Two base stations are shown, namely, STA1 and STA2. Typically, the base stations are mobile devices that are not strictly fixed in physical location relative to the access point or relative to each other. Base stations 10 are sometimes referred to as "wireless clients".

As shown in FIG. 2, base station STA1 sends frames 12 of wireless network transmissions to access point 1, and receives frames 13 of wireless network transmissions from the access point. Likewise, base station STA2 sends frames 16 of wireless network transmissions to access point 1, and receives frames 15 of wireless network transmissions from the access point. The frames are sent and received according to a wireless transmission protocol, of which one example is a CSMA/CA protocol according to IEEE 802.11.

Figure 3:
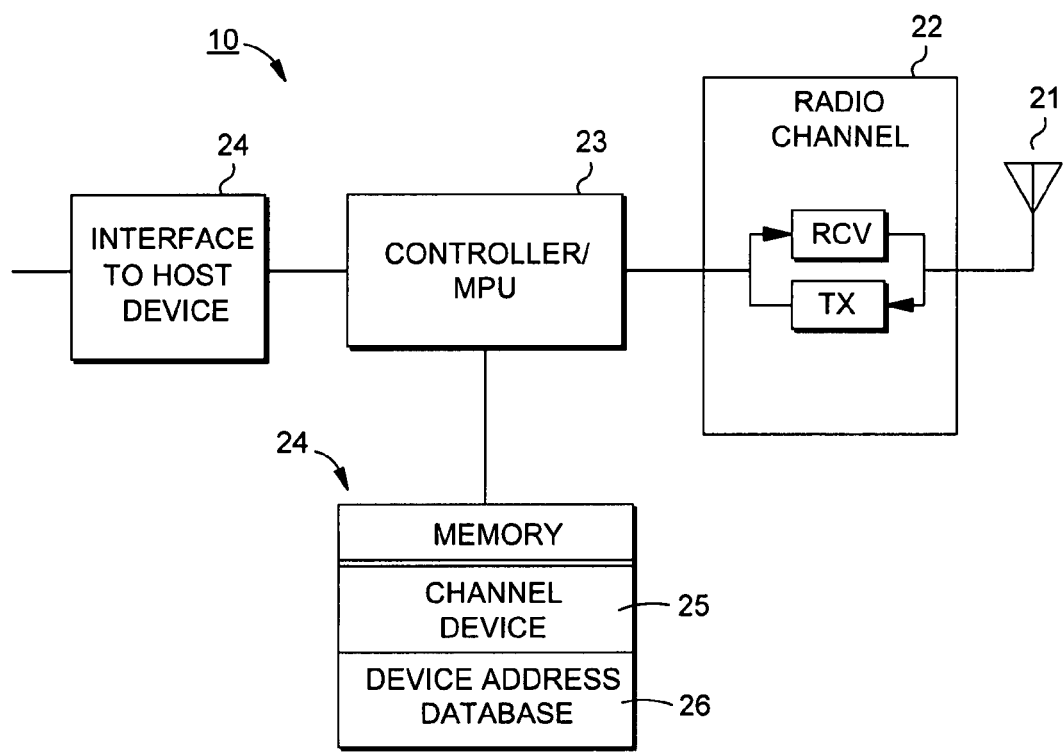
FIG. 3 is a block diagram depicting the internal structure of a base station.

FIG. 3 is a block diagram depicting the internal structure of base station 10. As seen in FIG. 3, base station 10 includes antenna 21 which is driven by radio channel 22 for sending and receiving frames of wireless data transmissions. Radio channel 22 is operated under control of controller/MPU ("microprocessor unit") 23, which communicates to a host device via interface 24. The host device may be a computer or a laptop computer, a mobile device, personal digital assistant, cell phone, or any host device for which wireless communication capability is desired. The interface may be a permanent connection or may be a disconnectable connection such as a PCI connection.

Radio channel 22 is responsible for exchange of data between base station 10 and access point 1, over a channel defined by a BSSID ("basic service set identifier"). If there are multiple access points in the WAN, then each access point typically uses a different BSSID for communication, so as to avoid interference from communications with other access points.

Base station 10 further includes memory 24, which may be read-only memory, programmable read-only memory, random access memory, or any combination thereof. Memory 24 includes firmware for operation of the base station, such as channel driver 25 for driving radio channel 22 according to the aforementioned CSMA/CA protocol. In addition, channel driver 25 is switchable to an RTS/CTS exchange mode, whereby there is a handshake involving a request-to-send frame sent by the base station to the access point, followed by an acknowledging clear-to-send frame transmitted from the access point back to the base station, before base station 10 commences transmission of wireless data.

Memory 24 further includes a device address database 26, which is accrued by controller/MPU 23 by scanning frames coming from the access point to other base stations with the same BSSID, and by scanning frames from other base stations with the same BSSID back to the access point. FIG. 4 shows the structure of the database.

As shown in FIG. 4, the device address database 26 includes the MAC address 27 of other base stations in the WAN, as well as a first flag 28 signifying whether frames have been detected from the access point to the base station, and a second flag 29 signifying whether frames have been detected from the base station back to the access point. The database is built by controller/MPU 23 by scanning frames of network transmissions. If a frame is detected to or from a base station whose MAC address is not already in the database, a new entry is made for the MAC address. Thereafter, flags 28 and 29 are updated. If a frame is detected from the access point to the base station, then an entry is made in flag 28; correspondingly, if a frame is detected from the base station to the access point, flag 29 is updated.

In FIG. 4, two representative entries are shown, corresponding to a situation in which any one base station 10 has seen frames for two other base stations on the WAN. In the first entry, corresponding to MAC address 01:23:45:67:89:AB, frames have been detected from the access point to the base station, and frames have also been detected from the base station back to the access point. Thus, for this particular device, flags 28 and 29 are both set to "YES". On the other hand, in the second entry, corresponding to MAC address 01:23:45:67:89:BC, frames have been detected from the access point to the base station, but there have not been any corresponding frames detected from the base station back to the access point. Thus, flag 28 is set to "YES", whereas flag 29 is set to "NO".

Periodically, controller/MPU 23 inspects the device address database 26 to determine if there are discrepancies. Here, "discrepancies" refers to a situation in which frames have been accrued from the access point to another base station, without also accruing frames from the other base station back to the access point. Referring again to the representative entries shown in FIG. 4, there is no discrepancy for the first base station with MAC address 01:23:45:67:89:AB, since frames have been accrued from both the access point to the base station as well as from the base station back to the access point. However, for the second base station with MAC address 01:23:45:67:89:BC, there is a discrepancy since frames have been accrued from the access point to the second base station, but not also back from the base station to the access point.

Upon determining that there is a discrepancy, controller/MPU 23 infers that the discrepancy is caused by the fact that, from the perspective of the base station, the second base station (with MAC address 01:23:45:67:89:BC) is a hidden node. Thus, having detected a discrepancy, controller/MPU 23 infers that there is a hidden node in the WAN, and controller/MPU 23 switches radio channel 22 into RTS/CTS exchange mode, so that communications with the access point are conducted using an RTS/CTS handshake.

Other base stations in the WAN conduct themselves similarly. Accordingly, even after only a short period of network activity, all base stations in the WAN will have detected that there are at least some hidden nodes, and all base stations will have switched to RTS/CTS exchange mode.

In the foregoing, a discrepancy is detected in a case where frames have been accrued from the access point to the second base station without also accruing frames back from the base station to the access point. In other embodiments, it is also possible to set thresholds to enable or disable RTS/CTS handshake mode. For example, using thresholds, if there are X more entries for YES in column 28 in comparison with the number of entries for YES in column 29, then a discrepancy is detected followed by a switch to RTS/CTS on; otherwise switch to RTS/CTS off. A check for discrepancies may be made each time a frame is received from another base station. A periodic check of the database is ordinarily needed only to remove entries from the database if a base station has left the network. Therefore, a count is made of the frames from the access point 1 to each device (column 28) and of the frames from each device to the access point (column 29). In addition, the counts may be aged so that controller/MPU 23 can recognize when a base station has left the network. If the base station that has left the network was formerly a hidden node, then controller/MPU 23 switches back to CSMA/CA mode, which is a more efficient mode since it does not secure RTS/CTS handshaking.

Figure 5:
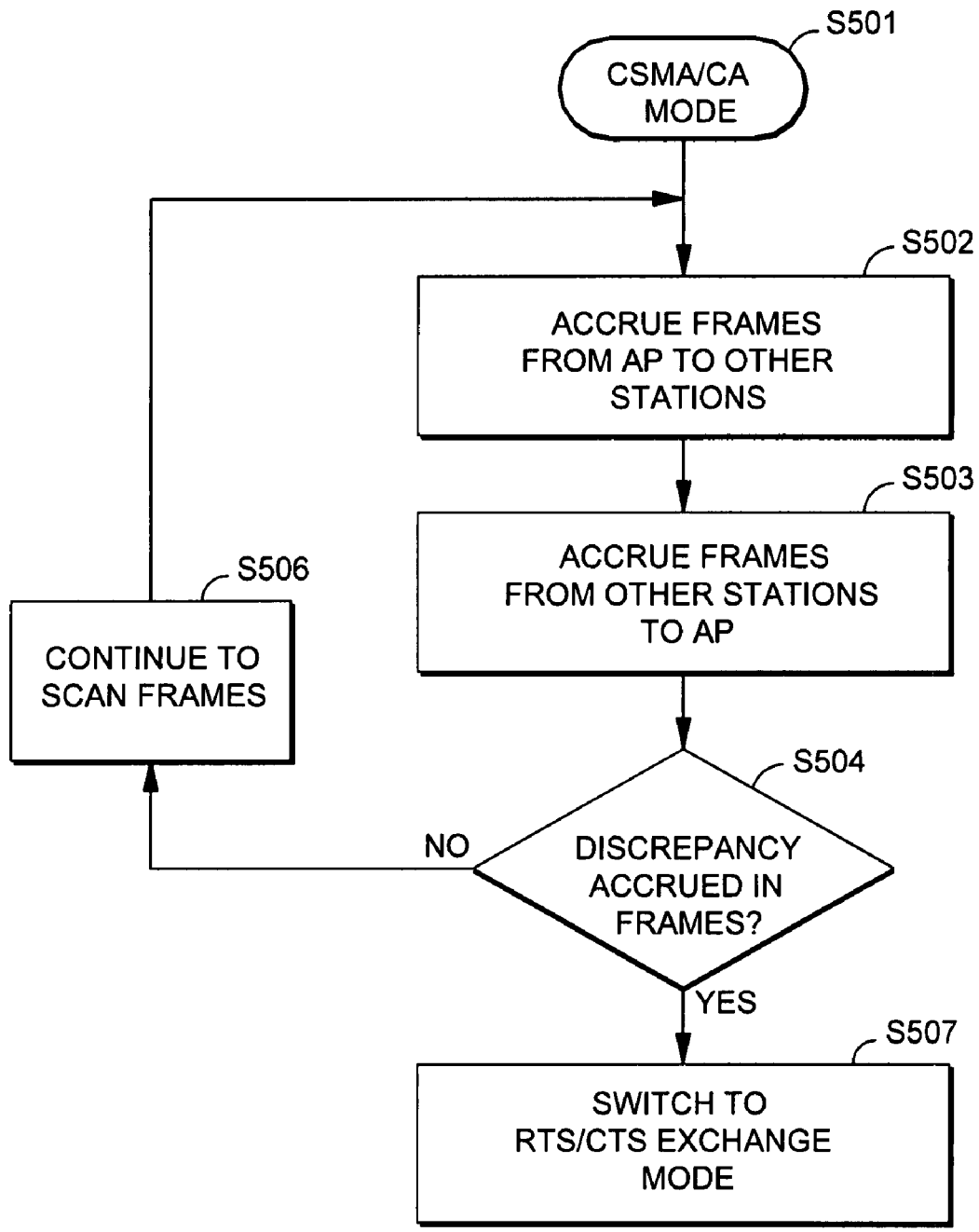
FIG. 5 is a flow diagram showing operation according to an embodiment of the invention.

FIG. 5 is a flow diagram showing operation according to an embodiment of the invention. Generally speaking, the process steps shown in FIG. 5 are stored as computer-executable code on a computer-readable memory medium such as memory 24, but also can be implemented in hardware, firmware, software, or a combination thereof. According to the steps shown in FIG. 5, in a wireless network environment in which there are one or more base stations communicating with one or more access points, frames of wireless network transmissions are accrued from the access point to other base stations and from other base stations to the access point. In a case where there is a discrepancy in the accrued frames, such that frames are accrued from the access point to a second base station without also accruing frames from the second base station back to the access point, a communication mode of the base station is switched from CSMA/CA to RTS/CTS exchange mode.

Thus, in step S501, a base station is communicating in CSMA/CA mode. In steps S502 and S503, frames are accrued from the access point to other base stations, as well as from other base stations back to the access point. Periodically, in step S504, a check is made for discrepancies in the accrued frames, to determine whether frames have been accrued from the access point to a second base station without also accruing frames from the second base station back to the access point. If there is not a discrepancy, then flow branches to step S506 in which frames continue to be accrued. On the other hand, if there is a discrepancy, then flow advances to step S507 in which the base station is switched to RTS/CTS exchange mode.

In addition, and as described above, it is also possible to switch back to CSMA/CA mode in embodiments that track the age of accrued frames and their counts.

Figure 6A:
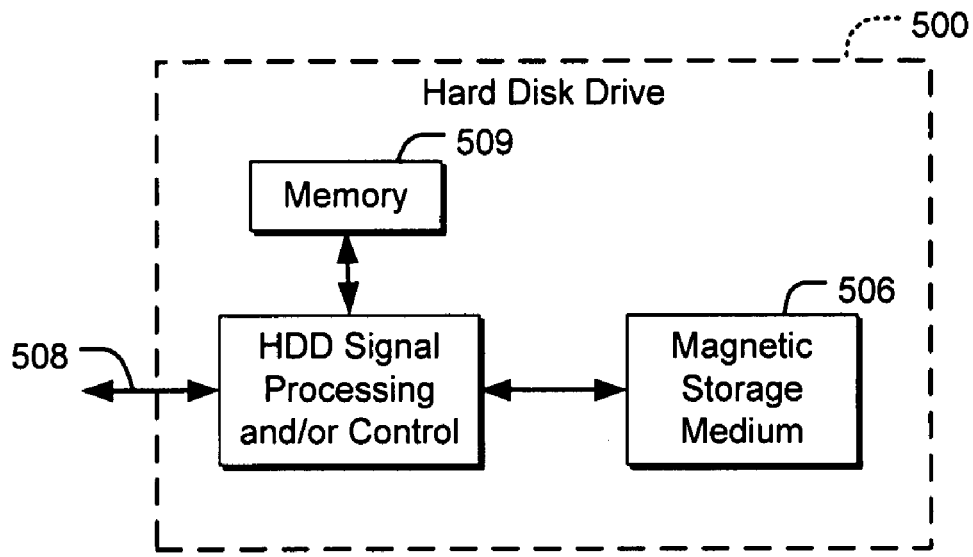
FIG. 6A is a block diagram showing an embodiment of the invention in a hard disk drive.

Referring now to FIGS. 6A-6H, various exemplary implementations of the present invention are shown. Referring to FIG. 6A, the present invention may be embodied as a base station in a hard disk drive 500. The present invention may implement either or both signal processing and/or control circuits, which are generally identified in FIG. 6A at 502. In some implementations, signal processing and/or control circuit 502 and/or other circuits (not shown) in HDD 500 may process data, perform coding and/or encryption, perform calculations, and/or format data that is output to and/or received from a magnetic storage medium 506.

HDD 500 may communicate with a host device (not shown) such as a computer, mobile computing devices such as personal digital assistants, cellular phones, media or MP3 players and the like, and/or other devices via one or more wired or wireless communication links 508. HDD 500 may be connected to memory 509, such as random access memory (RAM), a low latency nonvolatile memory such as flash memory, read only memory (ROM) and/or other suitable electronic data storage.

Figure 6B:
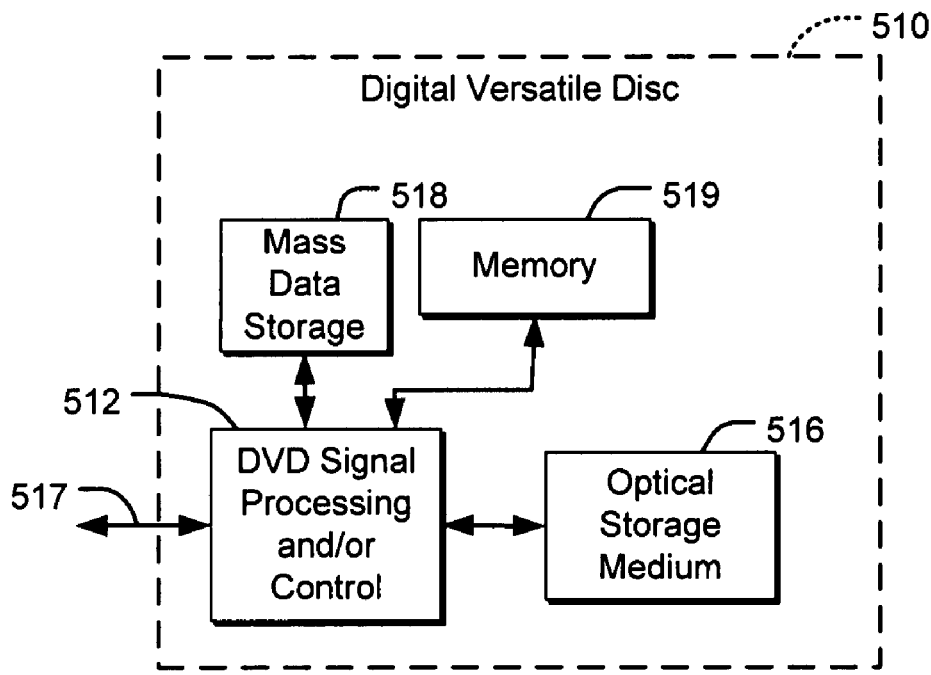
FIG. 6B is a block diagram of an embodiment of the invention in a DVD drive.

Referring now to FIG. 6B, the present invention may be embodied as a base station in a digital versatile disc (DVD) drive 510. The present invention may implement either or both signal processing and/or control circuits, which are generally identified in FIG. 6B at 512, and/or mass data storage 518 of DVD drive 510. Signal processing and/or control circuit 512 and/or other circuits (not shown) in DVD 510 may process data, perform coding and/or encryption, perform calculations, and/or format data that is read from and/or data written to an optical storage medium 516. In some implementations, signal processing and/or control circuit 512 and/or other circuits (not shown) in DVD 510 can also perform other functions such as encoding and/or decoding and/or any other signal processing functions associated with a DVD drive.

DVD drive 510 may communicate with an output device (not shown) such as a computer, television or other device via one or more wired or wireless communication links 517. DVD 510 may communicate with mass data storage 518 that stores data in a nonvolatile manner. Mass data storage 518 may include a hard disk drive (HDD) such as that shown in FIG. 6A. The HDD may be a mini HDD that includes one or more platters having a diameter that is smaller than approximately 1.8". DVD 510 may be connected to memory 519, such as RAM, ROM, low latency nonvolatile memory such as flash memory, and/or other suitable electronic data storage.

Figure 6C:
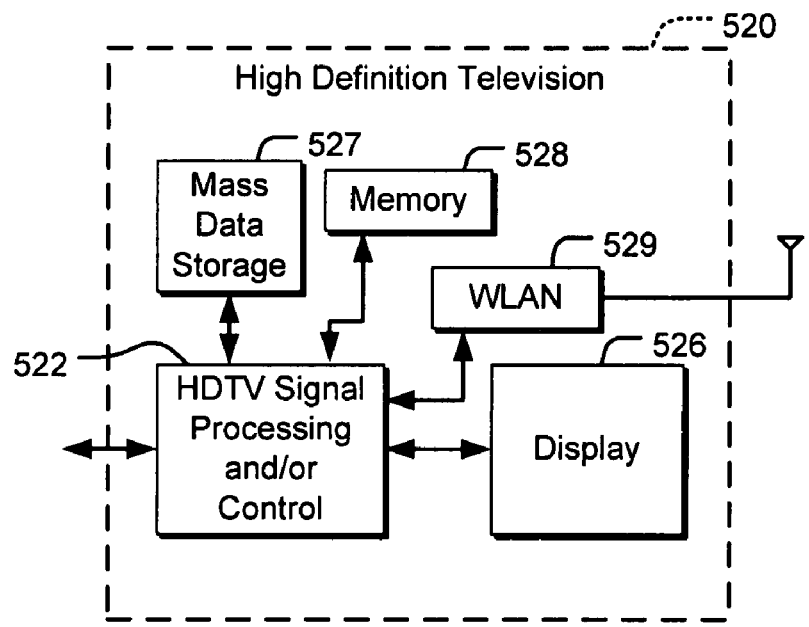
FIG. 6C is a block diagram of an embodiment of the invention in a high definition television (HDTV).

Referring now to FIG. 6C, the present invention may be embodied as a base station in a high definition television (HDTV) 520. The present invention may implement either or both signal processing and/or control circuits, which are generally identified in FIG. 6C at 522, a WLAN interface and/or mass data storage of the HDTV 520. HDTV 520 receives HDTV input signals in either a wired or wireless format and generates HDTV output signals for a display 526. In some implementations, signal processing circuit and/or control circuit 522 and/or other circuits (not shown) of HDTV 520 may process data, perform coding and/or encryption, perform calculations, format data and/or perform any other type of HDTV processing that may be required.

HDTV 520 may communicate with mass data storage 527 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8". HDTV 520 may be connected to memory 528 such as RAM, ROM, low latency nonvolatile memory such as flash memory and/or other suitable electronic data storage. HDTV 520 also may support connections with a WLAN via a WLAN network interface 529.

Figure 6D:
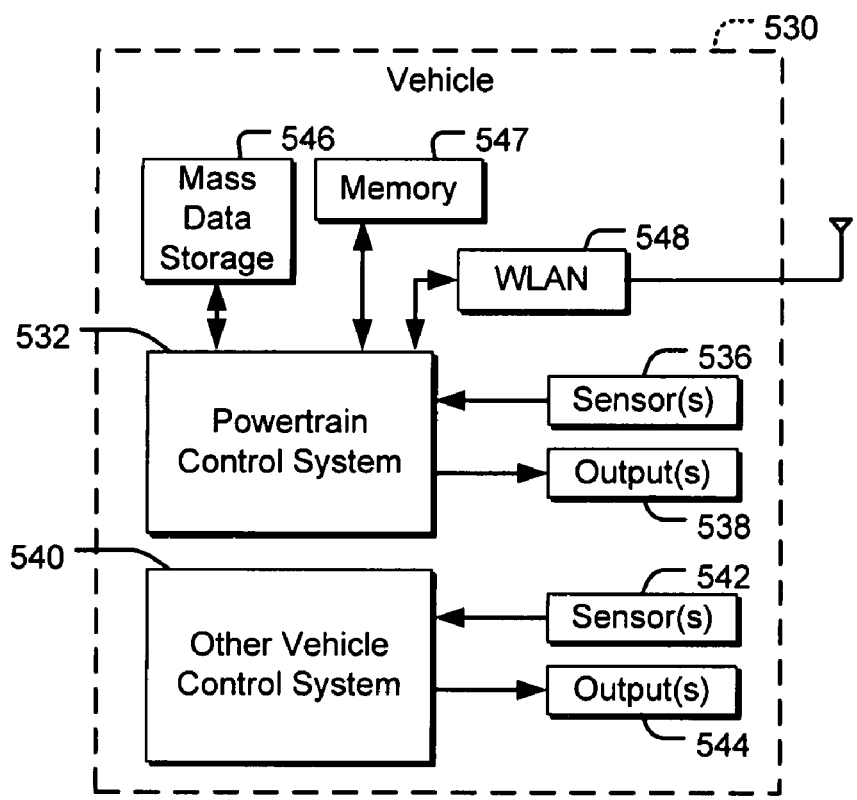
FIG. 6D is a block diagram of an embodiment of the invention in a vehicle control system.

Referring now to FIG. 6D, the present invention may be embodied as a base station in a control system of a vehicle 530, a WLAN interface and/or mass data storage of the vehicle control system. In some implementations, the present invention implements a powertrain control system 532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 540 of vehicle 530. Control system 540 may likewise receive signals from input sensors 542 and/or output control signals to one or more output devices 544. In some implementations, control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 532 may communicate with mass data storage 546 that stores data in a nonvolatile manner. Mass data storage 546 may include optical and/or magnetic storage devices for example hard disk drives HDD and/or DVDs. At least one HDD may have the configuration shown in FIG. 3A and/or at least one DVD may have the configuration shown in FIG. 6B. The HDD may be a mini HDD that includes one or more platters having a diameter that is smaller than approximately 1.8". Powertrain control system 532 may be connected to memory 547 such as RAM, ROM, low latency nonvolatile memory such as flash memory and/or other suitable electronic data storage. Powertrain control system 532 also may support connections with a WLAN via a WLAN network interface 548. The control system 540 may also include mass data storage, memory and/or a WLAN interface (all not shown).

Figure 6E:
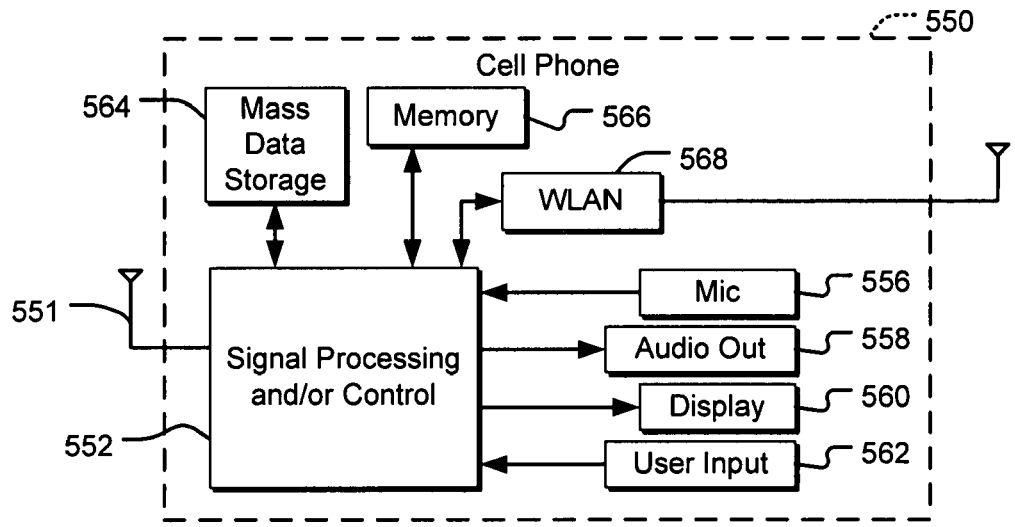
FIG. 6E is a block diagram of an embodiment of the invention in a cellular or mobile phone.

Referring now to FIG. 6E, the present invention may be embodied as a base station in a cellular phone 550 that may include a cellular antenna 551. The present invention may implement either or both signal processing and/or control circuits, which are generally identified in FIG. 6E at 552, a WLAN interface and/or mass data storage of the cellular phone 550. In some implementations, cellular phone 550 includes a microphone 556, an audio output 558 such as a speaker and/or audio output jack, a display 560 and/or an input device 562 such as a keypad, pointing device, voice actuation and/or other input device. Signal processing and/or control circuits 552 and/or other circuits (not shown) in cellular phone 550 may process data, perform coding and/or encryption, perform calculations, format data and/or perform other cellular phone functions.

Cellular phone 550 may communicate with mass data storage 564 that stores data in a nonvolatile manner such as optical and/or magnetic storage devices for example hard disk drives HDD and/or DVDs. At least one HDD may have the configuration shown in FIG. 3A and/or at least one DVD may have the configuration shown in FIG. 6B. The HDD may be a mini HDD that includes one or more platters having a diameter that is smaller than approximately 1.8". Cellular phone 550 may be connected to memory 566 such as RAM, ROM, low latency nonvolatile memory such as flash memory and/or other suitable electronic data storage. Cellular phone 550 also may support connections with a WLAN via a WLAN network interface 568.

Figure 6F:
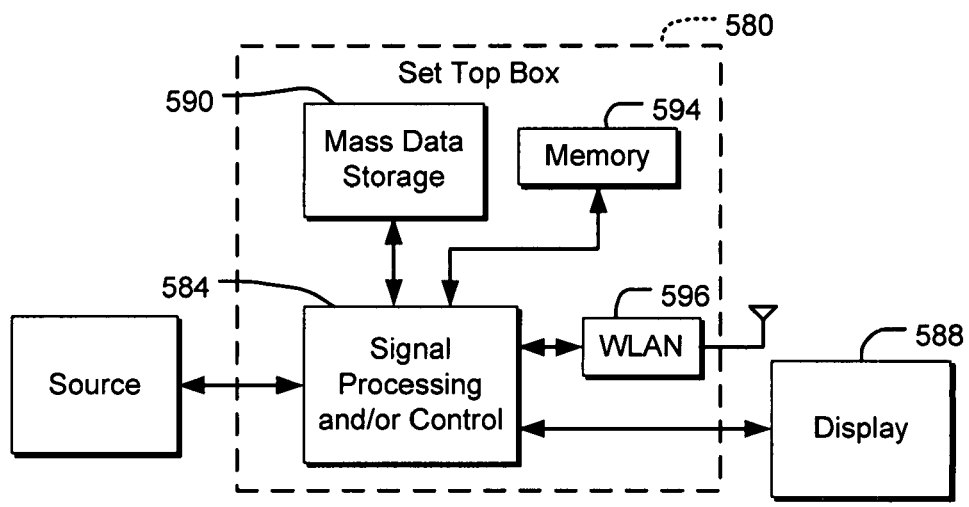
FIG. 6F is a block diagram of an embodiment of the invention in a set-top box (STB).

Referring now to FIG. 6F, the present invention may be embodied as a base station in a set top box 580. The present invention may implement either or both signal processing and/or control circuits, which are generally identified in FIG. 6F at 584, a WLAN interface and/or mass data storage of the set top box 580. Set top box 580 receives signals from a source such as a broadband source and outputs standard and/or high definition audio/video signals suitable for a display 588 such as a television and/or monitor and/or other video and/or audio output devices. Signal processing and/or control circuits 584 and/or other circuits (not shown) of the set top box 580 may process data, perform coding and/or encryption, perform calculations, format data and/or perform any other set top box function.

Set top box 580 may communicate with mass data storage 590 that stores data in a nonvolatile manner. Mass data storage 590 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Set top box 580 may be connected to memory 594 such as RAM, ROM, low latency nonvolatile memory such as flash memory and/or other suitable electronic data storage. Set top box 580 also may support connections with a WLAN via a WLAN network interface 596.

Figure 6G:
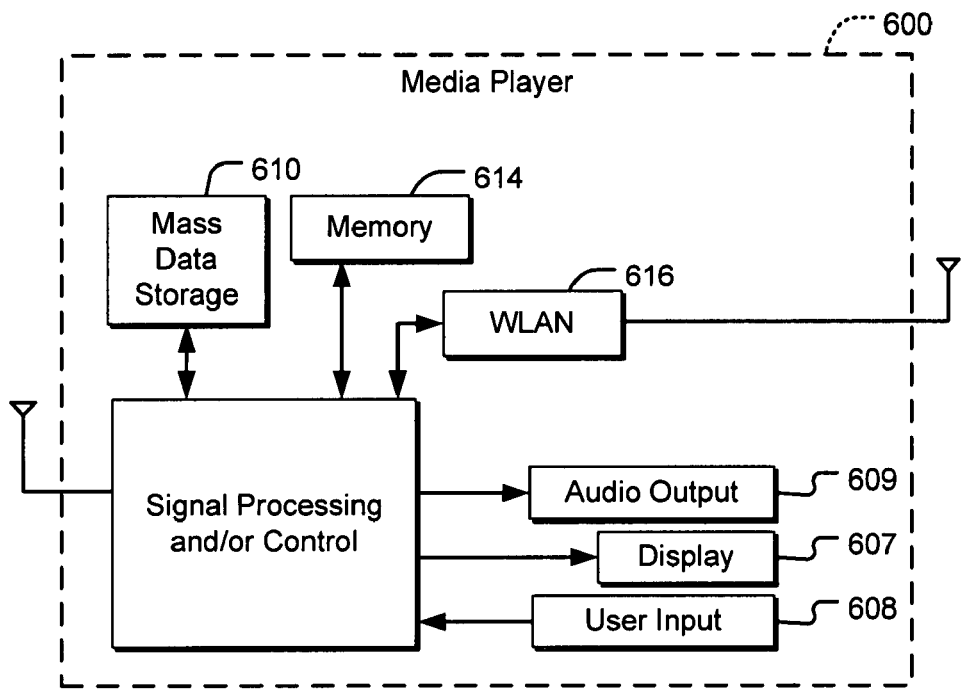
FIG. 6G is a block diagram of an embodiment of the invention in a media player.

Referring now to FIG. 6G, the present invention may be embodied as a base station in a media player 600. The present invention may implement either or both signal processing and/or control circuits, which are generally identified in FIG. 6G at 604, a WLAN interface and/or mass data storage of the media player 600. In some implementations, media player 600 includes a display 607 and/or a user input 608 such as a keypad, touchpad and the like. In some implementations, media player 600 may employ a graphical user interface (GUI) that typically employs menus, drop down menus, icons and/or a point-and-click interface via display 607 and/or user input 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via a WLAN network interface 616. Still other implementations in addition to those described above are contemplated.

Figure 6H:
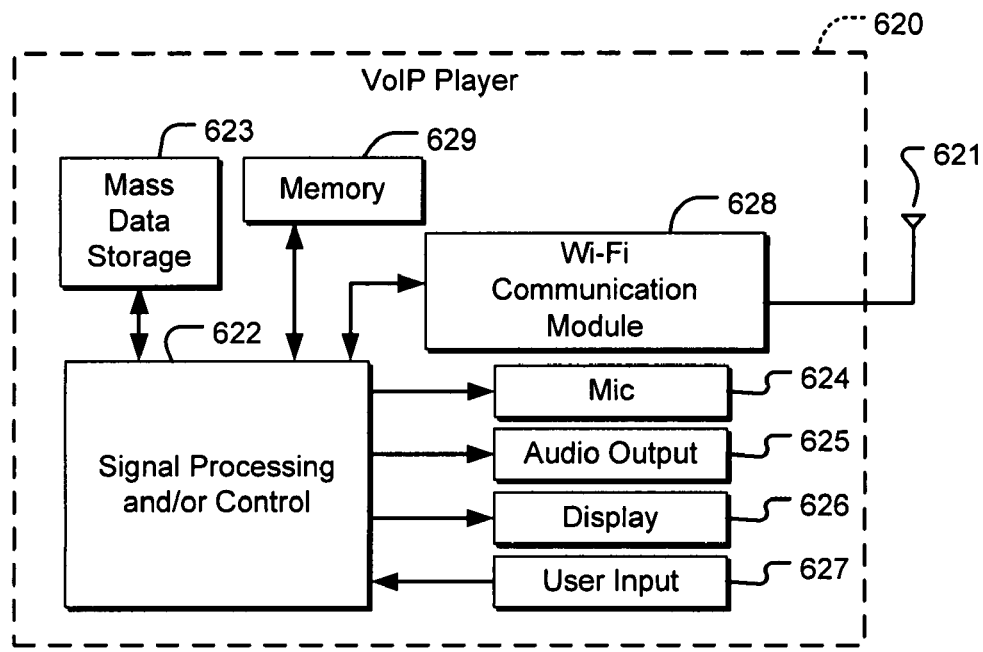
FIG. 6H is a block diagram of an embodiment of the invention in a VoIP player.

Referring to FIG. 6H, the present invention may be embodied as a base station in a Voice over Internet Protocol (VoIP) phone 620 that may include an antenna 621. The present invention may implement either or both signal processing and/or control circuits, which are generally identified in FIG. 6H at 622, a wireless interface and/or mass data storage of the VoIP phone 623. In some implementations, VoIP phone 620 includes, in part, a microphone 624, an audio output 625 such as a speaker and/or audio output jack, a display monitor 626, an input device 627 such as a keypad, pointing device, voice actuation and/or other input devices, and a Wireless Fidelity (Wi-Fi) communication module 628. Signal processing and/or control circuits 622 and/or other circuits (not shown) in VoIP phone 620 may process data, perform coding and/or encryption, perform calculations, format data and/or perform other VoIP phone functions.

VoIP phone 620 may communicate with mass data storage 623 that stores data in a nonvolatile manner such as optical and/or magnetic storage devices, for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". VoIP phone 620 may be connected to memory 629, which may be a RAM, ROM, low latency nonvolatile memory such as flash memory and/or other suitable electronic data storage. VoIP phone 620 is configured to establish communications link with a VoIP network (not shown) via Wi-Fi communication module 628.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A base station for communication in a wireless network, comprising:
   a radio channel for sending and receiving frames of wireless network transmissions according to a CSMA/CA protocol; and
   a controller for accruing frames from an access point to other base stations, and for accruing frames from other base stations to the access point;
   wherein said controller switches said radio channel to RTS/CTS exchange mode responsive to detection of a discrepancy between the frames accrued from the access point to a second base station and the frames accrued from the second base station to the access point.

2. A base station according to claim 1, wherein frames are accrued for frames having the same BSSID.

3. A base station according to claim 1, wherein frames are accrued for frames having the different BSSID's.

4. A base station according to claim 1, wherein said controller checks for discrepancies periodically.

5. A base station according to claim 1, further comprising a memory for storing a database of device addresses, and wherein said controller maintains the database of device addresses by making a new entry in the database in response to accrual of a frame addressed to or from a base station not already in the database, and by storing first and second flags respectively signifying whether frames have been detected from the access point to the base station and whether frames have been detected from the base station to the access point.

6. A base station according to claim 5, wherein said controller checks for discrepancies in the accrued frames by inspection of the first and second flags.

7. A base station according to claim 6, wherein said controller checks for discrepancies periodically.

8. A base station according to claim 1, wherein the discrepancy is detected in a case where frames are accrued from the access point to the second base station without also accruing frames from the second base station to the access point.

9. In a wireless network which includes at least one base station and at least one access point, a method performed by said one base station comprising:
   accruing frames of wireless network transmissions from the access point to other base stations and frames of wireless network transmissions from other base stations to the access point;
   checking for a discrepancy between the frames accrued from the access point to a second base station and the frames from the second base station to the access point; and
   in a case where a discrepancy is detected, switching a communication mode of said one base station from CSMA/CA to RTS/CTS exchange mode.

10. A method according to claim 9, wherein frames are accrued for frames having the same BSSID.

11. A method according to claim 9, wherein frames are accrued for frames having the different BSSID's.

12. A method according to claim 9, wherein said checking step checks for discrepancies periodically.

13. A method according to claim 9, which further comprises maintaining a database of device addresses, and wherein the database of device addresses is maintained by making a new entry in the database in response to accrual of a frame addressed to or from a base station not already in the database, and by storing first and second flags respectively signifying whether frames have been detected from the access point to the base station and whether frames have been detected from the base station to the access point.

14. A method according to claim 13, wherein said checking step checks for discrepancies in the accrued frames by inspection of the first and second flags.

15. A method according to claim 14, wherein said checking step checks for discrepancies periodically.

16. A method according to claim 9, wherein the discrepancy is detected in a case where frames are accrued from the access point to the second base station without also accruing frames from the second base station to the access point.

17. A wireless network element for communication in a wireless network which includes first and second wireless network elements which are all different from each other, comprising:
- a radio channel for sending and receiving frames of wireless network transmissions according to a CSMA/CA protocol; and
- a controller for accruing frames from the first wireless network element to the second wireless network element, and for accruing frames from such second wireless network element to the first wireless network element;
- wherein said controller switches said radio channel to RTS/CTS exchange mode responsive to detection of a discrepancy between the frames accrued from the first wireless network element to the second wireless network element and the frames accrued from the second wireless network element to the first wireless network element.

18. A wireless network element according to claim 17, wherein frames are accrued for frames having the same BSSID.

19. A wireless network element according to claim 17, wherein frames are accrued for frames having the different BSSID's.

20. A wireless network element according to claim 17, wherein said controller checks for discrepancies periodically.

21. A wireless network element according to claim 17, further comprising a memory for storing a database of device addresses, and wherein said controller maintains the database of device addresses by making a new entry in the database in response to accrual of a frame addressed to or from a second wireless network element not already in the database, and by storing first and second flags respectively signifying whether frames have been detected from the first wireless network element to the second wireless network element and whether frames have been detected from the second wireless network element to the first wireless network frame element.

22. A wireless network element according to claim 21, wherein said controller checks for discrepancies between accrued frames by inspection of the first and second flags.

23. A wireless network element according to claim 22, wherein said controller checks for discrepancies periodically.

24. A wireless network element according to claim 17, wherein a discrepancy is detected in a case where frames are accrued from the first wireless network element to the second wireless network element without also accruing frames from the second wireless network element to the first wireless network element.

* * * * *